United States Patent [19]
Shiina

[11] 3,807,247
[45] Apr. 30, 1974

[54] DOUBLE FLANGED TIMING BELT PULLEY AND THE MANUFACTURING METHOD THEREFOR

[75] Inventor: Toshio Shiina, Tokyo, Japan

[73] Assignee: Ricoh Co. Ltd., Tokyo, Japan

[22] Filed: Dec. 20, 1971

[21] Appl. No.: 209,650

[30] Foreign Application Priority Data
Dec. 28, 1970  Japan.............................. 45-119414

[52] U.S. Cl................................ 74/230.05, 29/159
[51] Int. Cl............................................ F16h 55/00
[58] Field of Search............ 74/231 C, 432, 230.01, 74/230.05, 216.5, 243 R, 243 C; 29/159 R, 159.01, 159.2, DIG. 18; 305/35 EB

[56]  References Cited
UNITED STATES PATENTS

| | | | |
|---|---|---|---|
| 2,718,790 | 9/1955 | Hughey............................ | 74/231 C |
| 2,507,852 | 5/1950 | Case.................................. | 74/231 C |
| 2,397,312 | 3/1946 | Forrest.............................. | 74/231 C |
| 438,124 | 10/1890 | Warwick........................... | 74/231 C |
| 2,968,187 | 1/1961 | Hoppe .............................. | 74/216.5 |

*Primary Examiner*—Charles J. Myhre
*Assistant Examiner*—R. H. Lazarus
*Attorney, Agent, or Firm*—Cooper, Dunham, Clark, Griffin & Moran

[57]  ABSTRACT

A timing belt pulley of integral construction provided with flanges on both sides wherein notched portions are provided and arranged alternatively, and a manufacturing method therefor.

2 Claims, 2 Drawing Figures

INVENTOR
TOSHIO SHIINA

BY

ATTORNEY

DOUBLE FLANGED TIMING BELT PULLEY AND THE MANUFACTURING METHOD THEREFOR

The present invention relates to a timing belt pulley formed as an integral part or coating and provided with flanges on both sides and a manufacturing method therefor.

In prior art timing belt pulleys of this type, the pulley and both flanges are manufactured as separate bodies and the flanges are pushed or press-fitted into a hub portion provided on both sides of the pulley body or are calked therein. Because of this, these timing pulley belts have many draw backs such as many parts, the push-in or calk process is complicated and these processes are unreliable. Accordingly, this has resulted in a high cost of the manufactured products.

The object of this invention is to obviate the above mentioned drawbacks of the conventional timing belt pulley by providing an integrally formed pulley casting.

Figure 1:
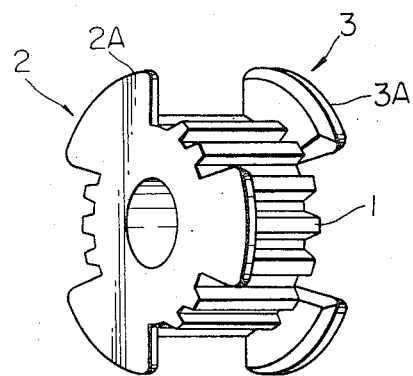
Figure 2:
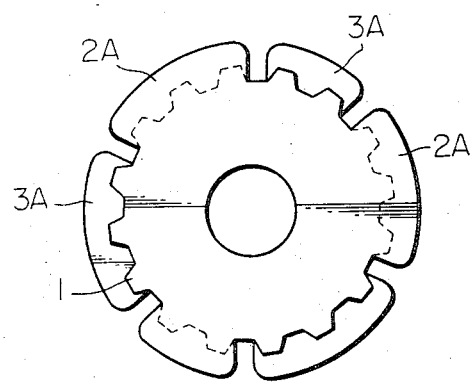

For a better understanding of the invention as well as other objects and further features thereof, reference is made to the following description of the invention taken in conjunction with the accompanying drawings wherein:

FIG. 1 is a perspective view of a timing belt pulley according to the present invention and FIG. 2 is a side view thereof.

In FIGS. 1 and 2, the pulley body 1 and both flanges 2 and 3 shown, are formed as an integral part. In this case, the both flanges 2 and 3 have notched portions arranged in substantially equal intervals and between these notched portions, each fan-shaped flange portions 2A and 3A respectively is positioned. The flange portions 2A and 3A are thus arranged alternately and the flange portion 2A of the flange 2 and the notched portion of the flange 3, and the notched portion of the flange 2 and the flange portion 3A of the flange 3 are respectively arranged oppositely. The width in the circumferential direction of the notched portions are, as seen in FIG. 2, a little wider than the corresponding width of the flange portions oppositely arranged.

As the timing belt pulley according to the present invention has the construction as mentioned above, the timing belt pulley 1 and both flanges 2 and 3 may be formed as an integral part by using a suitable set of dies. Accordingly, it becomes unnecessary to push in the flanges or calk the flanges at a later time.

At the time of forming, if the joints of a male die and a female die are arranged in the bottom portions of various cogs of the pulley itself, any adverse effect by a barrier formed in the joint, for example damage to a belt, can be avoided. It is preferred that the cutting depth of the cogs be larger than that of the conventional cogs so that a timing belt is not damaged even if a barrier is formed in the bottom portions of the cogs at the time of forming. Although in the drawings, there is shown an example wherein both flanges are divided into three flange portions, the present invention is not limited to this. The flange portions, in many cases, may be divided in accordance with the number of cogs of a pulley per se but it is not always necessary to do so. The case wherein the flanges cannot be divided equally depending upon the number of cogs may be occurred and in this case the flanges are divided in approximately equal.

As mentioned above, as the timing pulley of the present invention may be formed as an integral part or casting, the combination of the both flanges and the pulley per se is reliable. Therefore the present invention has a characteristics that the manufacturing cost becomes low.

What is claimed is:

1. A timing belt pulley of the type provided with flanges on both sides and a hub portion connecting said flanges and having cogs formed thereon, wherein said pulley comprises an integral member having a plurality of notched portions and flange portions provided in each flange, the notched portions in both flanges being arranged alternately with respect to each other so that the notched portions in each flange are positioned opposite from the flange portions of the opposite flange and the circumferential width of the notched portions of each flange being at least as great as the circumferential width of the flange portions of the opposite flange.

2. A timing belt pulley according to claim 1, in which the depth of the cogs of the pulley is greater than the depth of the corresponding cogs on a belt adapted to engage the pulley.

* * * * *